United States Patent [19]

Peter

[11] Patent Number: 4,960,998
[45] Date of Patent: Oct. 2, 1990

[54] METHOD AND APPARATUS FOR CONTINUOUSLY DETERMINING GAS-CARRIED ALPHA-RADIOACTIVITY

[76] Inventor: Juergen Peter, Hauckwaldstrasse 10, D-8755 Alzenau, Fed. Rep. of Germany

[21] Appl. No.: 384,755
[22] Filed: Jul. 25, 1989

[30] Foreign Application Priority Data

Jul. 25, 1988 [DE] Fed. Rep. of Germany ....... 3825205

[51] Int. Cl.$^5$ ............................ G01T 1/24; G01T 1/00
[52] U.S. Cl. ............................... 250/432 R; 250/255; 250/370.02; 250/370.03
[58] Field of Search ........... 250/253, 255, 364, 370.02, 250/370.03, 380, 432 R

[56] References Cited

U.S. PATENT DOCUMENTS 4,177,378 12/1979 Stevens ................................. 250/253
4,186,303 1/1980 Smith et al. ......................... 250/253
4,868,386 9/1989 Ilmasti ................................. 250/253

FOREIGN PATENT DOCUMENTS 0148873 11/1981 Japan ............................. 250/370.02

Primary Examiner—Janice A. Howell
Assistant Examiner—Drew A. Donn
Attorney, Agent, or Firm—Beveridge, DeGrandi & Weilacher

[57] ABSTRACT

A method and apparatus for the continuous determination of gas-carried alpha activity caused by the decay of thorium, uranium, plutonium and their decay products. In this method, the gas-carried alpha activity from the decay chains of radon 220 and/or radon 222 is subtracted from the total gas-carried alpha activity. The alpha activity from radon 220 and/or radon 222 is measured after an absorber which only transmits the alpha rays of polonium 212 or of polonium 212 and polonium 214.

5 Claims, 2 Drawing Sheets

N : Number of alpha particles
d : Thickness of air layer (cm)
R : Range (cm)

METHOD AND APPARATUS FOR CONTINUOUSLY DETERMINING GAS-CARRIED ALPHA-RADIOACTIVITY

INTRODUCTION AND BACKGROUND

The present invention relates to a method and apparatus for continuously determining gas-carried alpha activity from the decay of thorium, uranium, plutonium and from their decay products as the difference between the total gas-carried alpha activity and the gas-carried alpha activity of the radon 220 and/or radon 222 decay chains.

In order to ascertain the alpha activity by means of the exhaust air from nuclear fuel cycle plants, two boundary values differing from each other by several orders of magnitude are considered: a higher boundary value for the proportion of the Rn-220 and/or Rn-222 decay chains and a lower boundary value for the proportion of the residual alpha emitters due to uranium, thorium, plutonium and their decay products.

Because of the differences in the boundary values it is required to monitor separately the two proportions of all of the alpha activity. The activity of the Rn-220 or of the Rn-222 decay chains is then measured separately and deducted from the total alpha activity.

Depending on the materials processed in the plants, it suffices to measure the alpha activity of only one of the two radon decay chains. When processing thorium and reprocessed uranium, the nuclides of the radon 220 decay chain by far predominate those from the radon 222 decay chain. The reverse is the case when processing natural uranium. In part, the alpha activity of both decay chains also must be determined. The radon 220 decay chain includes the alpha emitters radon 220, polonium 216, bismuth 212 and polonium 212, while the radon 222 decay chain essentially includes the alpha emitters polonium 218, polonium 214 and polonium 210.

Ordinarily the gas-carried alpha activity of the nuclides of the radon 220 and/or radon 222 decay chain is measured by means of alpha spectrometers or an alpha-beta pseudo-coincidence difference (ABPD) method.

The known alpha-spectrometric measurement methods incur the drawback that because of the energy attenuation of the alpha particle on its way to the detector, the alpha radiation of a nuclide is measured in part in a lower energy band than is actually the case. Calibration of the alpha spectrometer is made more difficult thereby and the accuracy therefore is lowered, or longer measurement times ensue. A multi-channel alpha-spectrometer entails high costs, especially when measurement filters of large diameters, for instance of 20 cm, are being used, whereby several semiconducting detectors may be required.

The ABPD meter measures alpha decays occurring shortly upon a beta decay. Because of the very short half-life values of polonium 212 and polonium 214, these nuclides allowed's the determination of the decay-product activity to radon 220 and radon 222.

However, the ABPD method incurs the drawback that measurement accuracy is degraded by the alpha decays also of other nuclides which decay during the pseudo-coincidence time interval and are included in the count. As a result, the detection limit is degraded and longer measurement times ensue. Also, an ABPD apparatus is expensive because of the relatively complex electronics.

SUMMARY OF THE INVENTION

An object of the present invention is to provide a method for continuously determining the gas-carried alpha radioactivity of a gas arising from the decay of thorium, uranium, plutonium and their decay products as the difference between the total gas-carried alpha activity and the gas-carried alpha activity of the radon 220 and/or radon 222 decay chains, so as to allow high accuracy of measurement with short measuring times and low cost. Another object of the invention is to provide apparatus to carry out the method aspects of the invention.

In attaining the above and other objects, one feature of the invention resides in that the nuclides polonium 212 and/or polonium 214 are measured after an absorber retains the alpha rays from all other alpha nuclides This is carried out in order to determine the gas-carried alpha activity of the radon 220 and/or radon 222 decay chains. The gas-carried alpha activity of the radon 220 and/or radon 222 decay chains is thereby computed on that basis, such computation requiring the conventional determination of the alpha activity of radon 220 and polonium 216.

In this manner, it is possible to measure rapidly and with high accuracy and in reliable manner the gas-carried radioactivity of the radon 220 and/or radon 222 decay chain nuclides and the total gas-carried alpha activity and thereby also the gas-carried alpha activity caused by the decay of thorium, uranium, plutonium and their decay products.

An apparatus essentially consisting of an alpha counter and a measurement filter has been found suitable to carry out the above method, an absorber being mounted between the alpha counter and the measurement filter. The absorber has a thickness such that only the high-energy alpha rays from polonium 212 and/or polonium 214 can pass through it. Any suitable absorber material used in this way can be used for purposes of the invention, such as air or aluminum foil.

Advantageously, the absorber is movable so that by moving it into or out of the space between the alpha counter and the measurement filter, both the total gas-carried alpha activity and the gas-carried alpha activities from the radon 220 and/or radon 222 decay chain nuclides can be measured.

DETAILED EMBODIMENT OF THE INVENTION

Figure 1:
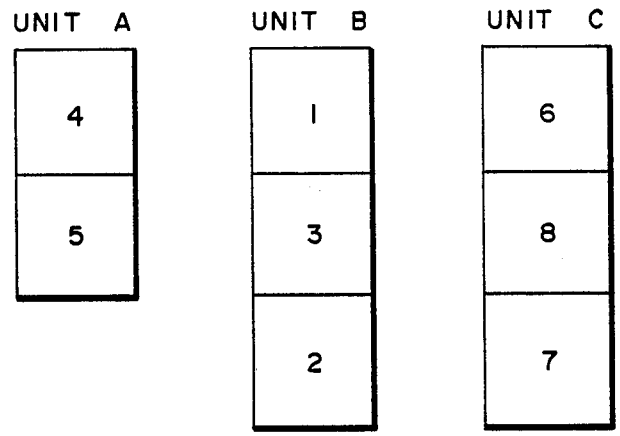
FIG. 1 is block diagram of an apparatus to measure the gas-carried total alpha activity and the gas-carried alpha activities of the two radon decay chains separately.

The apparatus of FIG. 1 is formed of three measuring units, where unit A is composed of the alpha counter 4 and measurement filter 5 and measures the total gas-carried alpha activity. Unit A (4 and 5) measures the total alpha activity. Measurement units B and C measure either separately or jointly the gas-carried alpha activities of the two radon decay chains (Rn-220 and Rn-222), respectively formed of an alpha counter (1,6) and a measurement filter (2,7) between which is mounted an absorber (3,8), absorber (3) and absorber (8) being of different thickness (not shown in drawing) and accordingly transmitting only the alpha rays from polonium 212 or from polonium 212 and polonium 214.

The gas flows through a gap between (a) the alpha counter (4) and filter (5) at unit A; and (b) absorber (3) or and filter (2 or 7) at units B and C. The gas stream is split and passes through the units in parallel. The gas stream entering into the units A and B or C contains alpha rays from all contributing nuclides; i.e., the situation before the Po 212 or Po 212 plus Po 214 discrimination.

The nuclides Po 212 and Po 214 are measured as tracer nuclides to determine Rn-220 or Rn-222 decay product activity. The invention is based on Po 212 exhibiting the highest energy (8.78 Mev) and Po 214 the second-highest energy (7.68 Mev) of the alpha rays under consideration. The absorbers (3,8) totally blocking the alpha rays except for those from Po 212 or from Po 212 and Po 214, are mounted between the measurement filters (2,7) and the alpha detectors (1,6).

Figure 2:
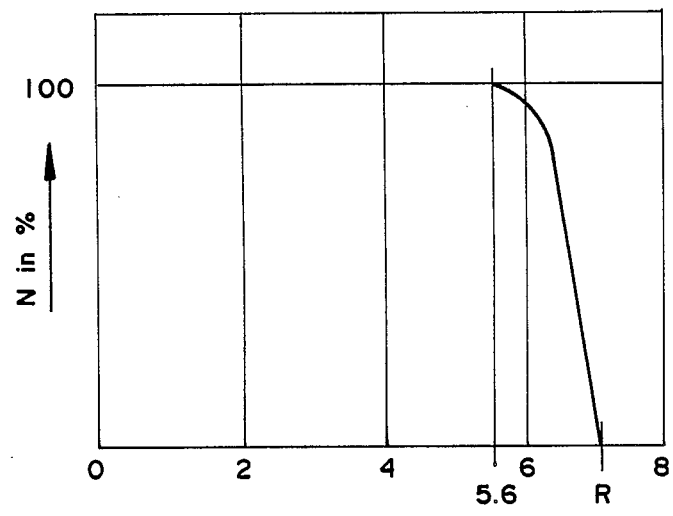
FIG. 2 shows the known transmission curve for Po 214 alpha radiation.
Figure 3:
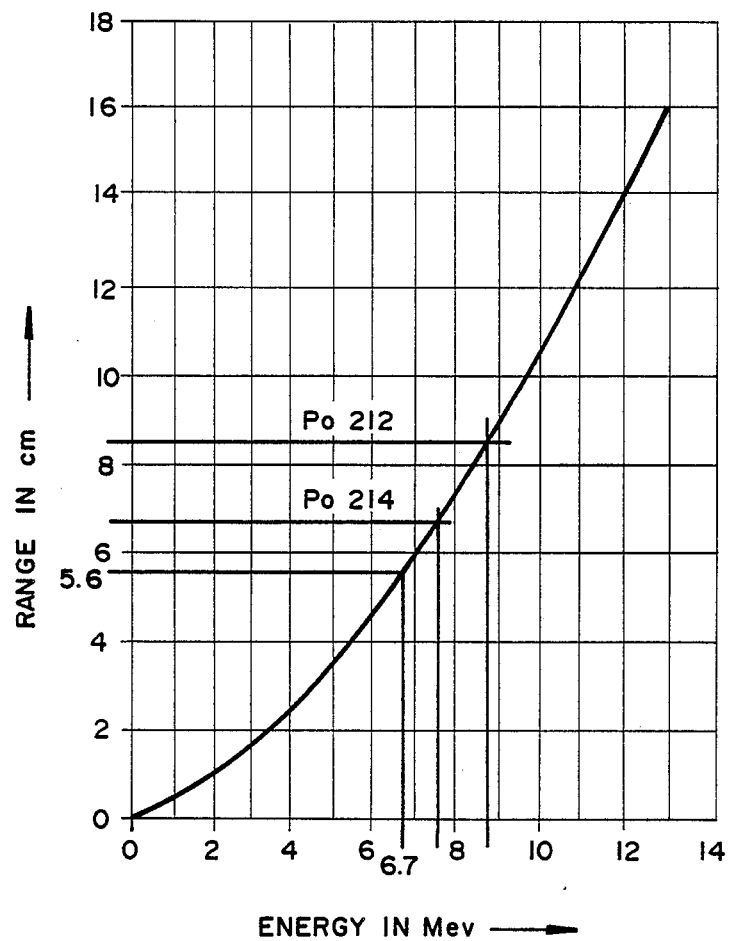
FIG. 3 shows the ranges in air of the alpha radiation from Po 212 and Po 214 as a function of energy.

The measurement method is based on the number of alpha particles remaining constant initially when passing through an absorber and dropping to zero (for a suitably thick absorber) very rapidly at the end of their paths as demonstrated by the Example of Po 214, FIG. 2.

The calculation is illustrated for the case of Rn220 as follows:

The Rn-220 plus daughter alpha activity is calculated as the sum of

- Rn-220 plus Po 216 alpha activity and
- Bi 212 plus Po 212 alpha activity.

The Rn-220 plus Po 216 alpha activity is measured conventionally. The Bi 212 plus Po 212 alpha activity is obtained by dividing the Po 212 activity measured downstream of the absorber by 0.638 (fraction of Bi 212 decay yielding Po 212).

As shown in FIG. 2, 100% of the Po 214 alpha particles still traverse an air layer 5.6 cm thick. The range of the Po 214 alpha rays is 6.9 cm.

The value of 5.6 cm for the thickness corresponds to an energy of 6.7 Mev. The absorber 8 illustratively therefore may consist of an air layer 5.6 cm thick. Thereupon Po 214 together with Po 212 can be distinguished from all other occurring alpha rays (Bi 212 presenting the highest alpha energy of 6.34 Mev).

The range of the polonium 212 alpha radiation is 8.5 cm. In this respect, 100% Po 212 alpha particles pass through an air layer 7.0 cm thick (in principle the behavior of Po 212 is the same as shown for Po 214 in FIG. 2). Illustratively, the absorber (3) may be 7.0 cm air layer. In that case, Po 212 can be distinguished from all other present alpha rays (including those from Po 214).

When computing the gas-carried alpha radioactivity of the radon 220 decay chain, the activities of radon 220 and of polonium 216 must be measured in conventional manner in addition to the measurement of the activity from polonium 212.

The measurement filters (5, 2, 7) used in accordance with the invention are conventional. The thickness of the absorber is determined by laboratory experiments.

The method of the invention offers a high detection limit and therefore allows short measurement times. Also, it can be carried out economically and the measurement apparatus requires only little maintenance relatively speaking.

Further variations and modifications of the foregoing will be apparent to those skilled in the art and are intended to be encompassed by the claims appended hereto.

German priority application P 38 25 205.8-33 is relied on and incorporated by reference.

I claim:

1. A method for determining the gas-carried alpha radioactivity caused by the decay of thorium, uranium, plutonium and their decay products, in the form of the difference between the total gas-carried alpha activity and the gas-carried alpha activity of the radon 220 or radon 222 decay chains or mixtures thereof comprising in order to determine the gas-carried alpha activity of the radon 220 and/or radon 222 decay chains, measuring the nuclides polonium 212 and/or polonium 214, or mixtures thereof after absorbing the alpha rays of all the other nuclides in an absorber capable thereof, measuring the alpha activity of radon 220 and polonium 216, and computing the gas-carried alpha activity of the radon 220 or radon 222 decay chains or mixtures thereof.

2. The method according to claim 1 wherein the absorber is air or aluminum foil.

3. The method according to claim 1 wherein the absorber is moved in an out of a space between an alpha counter means and a measurement filter means.

4. An apparatus to determine the gas-carried alpha activity caused by the decay of thorium, uranium, plutonium and their decay products comprising an alpha counter and a measurement filter and for measuring the gas-carried alpha activity of the radon 220 and/or radon 222 decay chains, an absorber (3) mounted between the alpha counter (1) and the measurement filter (2), the thickness of said absorber being such that only the alpha rays of polonium 212 and/or polonium 214 may traverse it.

5. The apparatus according to claim 4 wherein the absorber (3) is movable in between and away from the alpha counter (1) and the measurement filter (2).

* * * * *